United States Patent
Ebsen et al.

(10) Patent No.: US 10,049,040 B2
(45) Date of Patent: Aug. 14, 2018

(54) JUST IN TIME GARBAGE COLLECTION

(75) Inventors: David S. Ebsen, Minnetonka, MN (US); Ryan J. Goss, Prior Lake, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 1523 days.

(21) Appl. No.: 13/011,228

(22) Filed: Jan. 21, 2011

(65) Prior Publication Data

US 2012/0191936 A1 Jul. 26, 2012

(51) Int. Cl.
| | |
|---|---|
| *G06F 12/00* | (2006.01) |
| *G06F 13/00* | (2006.01) |
| *G06F 13/28* | (2006.01) |
| *G06F 12/02* | (2006.01) |

(52) U.S. Cl.
CPC ...... *G06F 12/0253* (2013.01); *G06F 12/0246* (2013.01); *G06F 12/0269* (2013.01); *G06F 12/0276* (2013.01)

(58) Field of Classification Search
CPC ............ G06F 12/0246; G06F 12/0253; G06F 12/0276; G06F 12/0269
USPC ........................................................ 711/170
See application file for complete search history.

(56) References Cited

U.S. PATENT DOCUMENTS

| | | | |
|---|---|---|---|
| 5,270,979 A | 12/1993 | Harari et al. | |
| 5,369,615 A | 11/1994 | Harari et al. | |
| 6,065,020 A * | 5/2000 | Dussud | |
| 6,829,686 B2 | 12/2004 | Mathiske et al. | |
| 7,657,793 B2 | 2/2010 | Avritzer | |
| 7,774,392 B2 | 8/2010 | Lin | |
| 2001/0023472 A1 | 9/2001 | Kubushiro et al. | |
| 2002/0107879 A1 | 8/2002 | Arnold et al. | |
| 2002/0166022 A1 | 11/2002 | Suzuki | |
| 2004/0177212 A1 | 9/2004 | Chang et al. | |
| 2004/0248612 A1 * | 12/2004 | Lee et al. | 455/550.1 |
| 2005/0141312 A1 | 6/2005 | Sinclair et al. | |
| 2005/0144357 A1 | 6/2005 | Sinclair | |
| 2006/0117223 A1 | 6/2006 | Avritzer et al. | |
| 2006/0130044 A1 | 6/2006 | Avritzer et al. | |
| 2006/0161724 A1 | 7/2006 | Bennett et al. | |
| 2007/0101095 A1 | 5/2007 | Gorobets | |
| 2007/0101096 A1 | 5/2007 | Gorobets | |
| 2007/0174370 A1 * | 7/2007 | Detlefs et al. | 707/206 |
| 2007/0174579 A1 * | 7/2007 | Shin | 711/170 |
| 2008/0056012 A1 | 3/2008 | Erez | |
| 2008/0059692 A1 | 3/2008 | Erez | |
| 2008/0251885 A1 * | 10/2008 | Kobayashi | 257/529 |
| 2008/0279005 A1 | 11/2008 | France | |

(Continued)

OTHER PUBLICATIONS

Office Action from U.S. Appl. No. 13/011,246, dated Feb. 12, 2014, 22 pages.

*Primary Examiner* — Charles Rones
*Assistant Examiner* — Sidney Li
(74) *Attorney, Agent, or Firm* — Westman, Champlin & Koehler, P.A.

(57) ABSTRACT

The disclosure is related to systems and methods of managing a memory. In a particular embodiment, a memory is disclosed that includes multiple garbage collection units. The memory also includes a controller that determines whether to select a garbage collection unit of the multiple garbage collection units for garbage collection based on a variable threshold number of the multiple garbage collection units to garbage collect.

13 Claims, 6 Drawing Sheets

(56) References Cited

U.S. PATENT DOCUMENTS

| | | |
|---|---|---|
| 2008/0281885 A1* | 11/2008 | Dussud .................. 707/206 |
| 2009/0132761 A1 | 5/2009 | Yim et al. |
| 2009/0172258 A1* | 7/2009 | Olbrich et al. ............ 711/103 |
| 2009/0180325 A1 | 7/2009 | Ito |
| 2009/0287956 A1 | 11/2009 | Flynn et al. |
| 2009/0310408 A1 | 12/2009 | Lee et al. |
| 2010/0153675 A1* | 6/2010 | Kumar .................. 711/170 |
| 2011/0107050 A1* | 5/2011 | Vengerov ............... 711/170 |
| 2012/0005405 A1* | 1/2012 | Wu et al. ............... 711/103 |

* cited by examiner

JUST IN TIME GARBAGE COLLECTION

CROSS-REFERENCE TO RELATED APPLICATION

Reference is made to co-pending and commonly assigned U.S. patent application Ser. No. 13/011,246, filed Jan. 21, 2011, entitled "GARBAGE COLLECTION MANAGEMENT IN MEMORIES", the content of which is hereby incorporated by reference in its entirety.

BACKGROUND OF THE INVENTION

Data storage/memory devices are one of many components of modern computers. Examples of data storage devices include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit. Random-access memories (RAMs) and other similar memories are also forms of computer data storage. The disclosure is generally related to systems and methods of improving memory device performance. More specifically, the disclosure relates to systems and methods for memory garbage collection, which involves reclaiming storage space from memory blocks (or garbage collection units) that include at least some invalid data.

SUMMARY OF THE INVENTION

In a particular embodiment, a memory is disclosed that includes multiple garbage collection units. The memory also includes a controller that determines whether to select a garbage collection unit of the multiple garbage collection units for garbage collection based on a variable threshold number of the multiple garbage collection units to garbage collect.

In another particular embodiment, a method is disclosed that includes providing multiple garbage collection units, and establishing a variable threshold number of the multiple garbage collection units to garbage collect. The method also includes determining whether to select a garbage collection unit of the multiple garbage collection units for garbage collection based on the variable threshold number of the multiple garbage collection units to garbage collect.

In still another particular embodiment, a memory is disclosed that includes multiple garbage collection units. The memory also includes a controller that determines whether to select a garbage collection unit of the multiple garbage collection units for garbage collection based on three different threshold numbers of the multiple garbage collection units to garbage collect.

DETAILED DESCRIPTION OF ILLUSTRATIVE EMBODIMENTS

Figure 1:
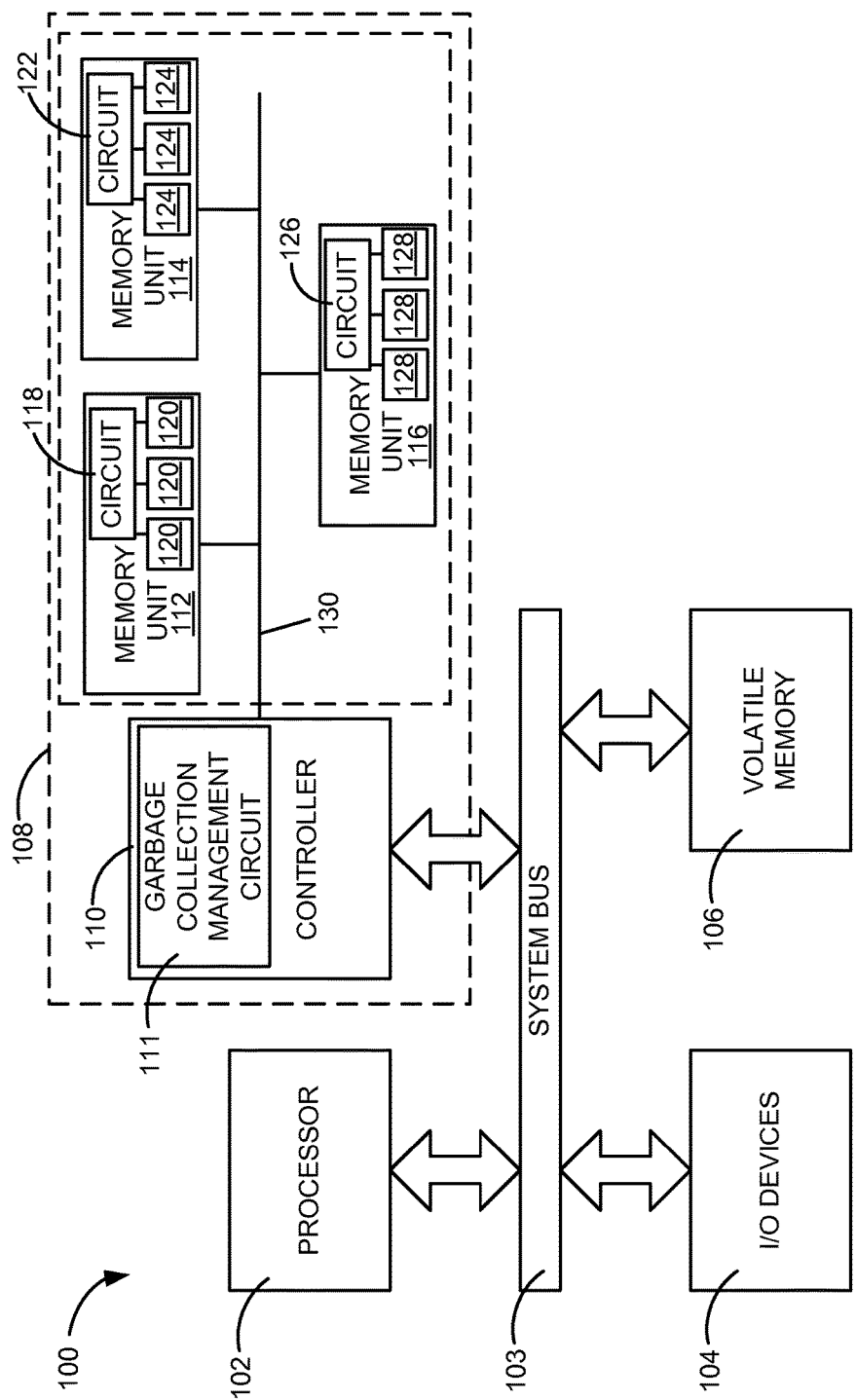
FIG. 1 is a diagram of an illustrative embodiment of a system of memory management.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related to systems and methods for just in time garbage collection in a memory. The systems and methods described herein are particularly useful for flash memory systems; however, the systems and methods described herein can be applied to other types of memory systems where just in time garbage collection is desired.

Solid state drives (SSDs) and other similar storage devices typically employ media that have a restriction of only being able to erase block(s) at a time. Since the block size is generally about 256 pages, some blocks will have at least some of their pages containing invalid data (for example, obsolete or old copies of data) over time. To maximize usage of blocks that include at least some invalid page data and to facilitate better over-provisioning (better use of reserved storage blocks), any valid page data in the blocks with at least some invalid data may be relocated to new blocks prior to erasing the blocks with the invalid data. Garbage collection is the process of reclaiming space within one or more such blocks (referred to herein as garbage collection units (GCUs)). After a garbage collection process is completed on a particular GCU, the GCU is ready for new data.

The garbage collection process comprises multiple steps in a particular example. A first step involves selecting a GCU to erase. A next step involves, determining which pages inside the GCU have valid data. Once identified, the valid data is read and re-written to a new location. Finally, the GCU is erased. Care should be taken in the selection of the GCU as any relocation of valid data is essentially write amplification.

Memory requests used to perform garbage collection should typically take place at some rate greater than host input/output memory requests. If this were not the case, host traffic would stall until garbage collection was complete, which currently occurs in many products. If host traffic is non-uniform, as in real life, then the demand for erased GCUs will change over time. The amount of erased GCUs kept in reserve directly subtracts from over-provisioning in the memory device. The amount of over-provisioning available to hold data affects write amplification in an exponential relationship. Losing any over-provisioning space comes at a high cost to the lifetime of the memory device. Therefore, there is a balance needed between a rate at which garbage collection is carried out and actual demand from host input/output.

The following description relates to garbage collecting memory blocks using a "just in time" scheme. This approach monitors a demand for erased memory blocks and dynamically adjusts a rate and system priority of garbage collection requests. The effect is a smooth blend of garbage collection and host input/output, which can better accommodate changes in host traffic. Under this technique, host traffic will not "stall" waiting for erased GCUs. This method also has a minimum impact to system over-provisioning space since it maintains "just enough" erased GCUs to meet host demand.

In a particular embodiment, a memory is disclosed that includes multiple garbage collection units. The memory also includes a controller that determines whether to select a garbage collection unit of the multiple garbage collection units for garbage collection based on a variable threshold number of the multiple garbage collection units to garbage collect.

In another particular embodiment, a method is disclosed that includes providing multiple garbage collection units, and establishing a variable threshold number of the multiple garbage collection units to garbage collect. The method also includes determining whether to select a garbage collection unit of the multiple garbage collection units for garbage collection based on the variable threshold number of the multiple garbage collection units to garbage collect.

In still another particular embodiment, a memory is disclosed that includes multiple garbage collection units. The memory also includes a controller that determines whether to select a garbage collection unit of the multiple garbage collection units for garbage collection based on three different threshold numbers of the multiple garbage collection units to garbage collect.

Referring to FIG. 1, a particular embodiment of a system of memory management is shown and generally designated 100. The system of memory management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus may also be coupled to a memory device 108. In a particular embodiment, the memory device 108 comprises a non-volatile flash memory device.

The memory device 108 may include a controller 110, which may be coupled to the processor 102 via a connection through the system bus 103. The controller 110 may include a garbage collection management circuit 111, which is described in detail further below. The memory device 108 may also contain multiple memory units such as 112, 114 and 116. Each memory unit may comprise one or more integrated circuit memory chips. Each memory unit 112, 114, 116 may include a memory unit control circuit 118, 122, 126 and a plurality of physical blocks 120, 124, 128 in which data may be stored. Each memory unit control circuit 118, 122, 126 may include erase, write and read circuits for operating the respective physical blocks 120, 124 or 128. As noted above, garbage collection is the process of reclaiming space within one or more blocks (referred to as GCUs). A GCU may be a single one of physical blocks 120, 124 or 128 or any combination of multiple ones of physical blocks 120, 124 and 128. At different stages during operation of memory device 108, one or more GCUs may be garbage collected to recover unused storage space. As will be described in detail further below, garbage collection management circuit 111 helps implement just in time garbage collection within device 108. In the embodiment shown in FIG. 1, all memory units in memory device 108 may be connected to a single memory bus 130, which also may couple to controller 110. Controller 110 may perform intelligent and higher level memory operations and interfacing. Some of these features of controller 110 are described below.

During operation, the processor 102 may send a command and data to the memory device 108 to retrieve or store data. The controller 110 can receive the command and data from the processor 102 and then manage the execution of the command to store or retrieve data from the memory units 112, 114 and 116. As noted above, controller 110 includes a garbage collection management circuit 111 that helps implement just in time garbage collection within device 108. In a particular embodiment, garbage collection management circuit 111 determines whether to select a GCU of the multiple garbage collection units for garbage collection based on a variable threshold number of the multiple garbage collection units to garbage collect. Details regarding how the variable threshold number of the multiple garbage collection units to garbage collect is utilized to carry out just in time garbage collection is described below in connection with FIGS. 2 and 3A-3C.

Figure 2:
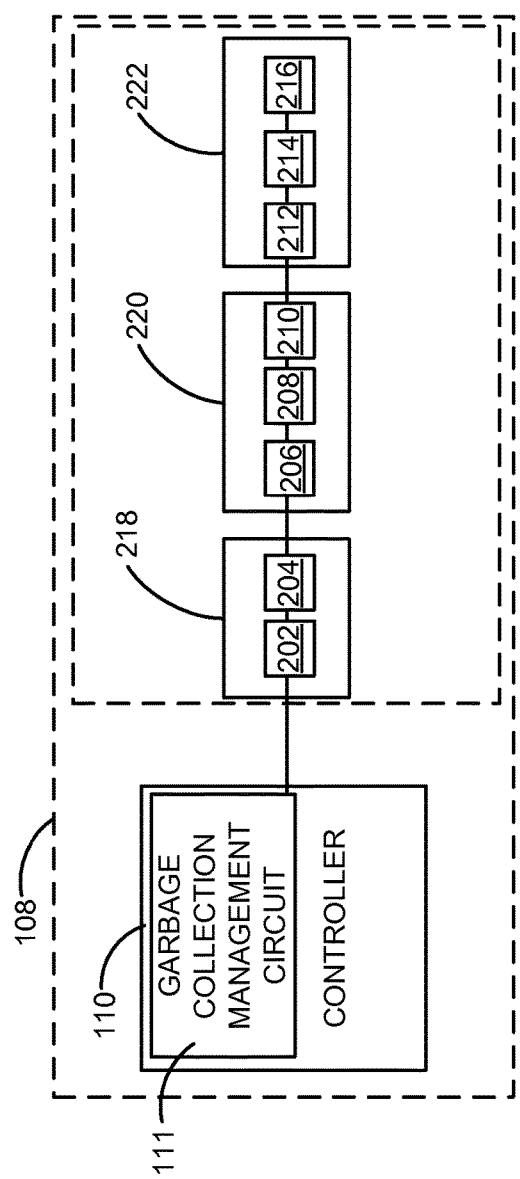
FIG. 2 is another diagram of an illustrative embodiment of a system of memory management.

Referring now to FIG. 2, an embodiment of memory device 108 is shown in which individual memory units and specific blocks within the memory units are not separately depicted in the interest of simplification, and in order to focus on the operation of garbage collection management circuit 111 in one embodiment. As indicated above, depending on how a memory is configured, a GCU may be a single physical block or may constitute more than one physical block. From a garbage collection standpoint, memory 108 can be viewed as including multiple GCUs, for example, 202 through 216 that are coupled to garbage collection management circuit 111 within controller 110 as shown in FIG. 2. In one embodiment, the multiple GCUs 202 through 216 are divided into different subsets or usage groups 218, 220, 222 based on nature of usage. For example, assignment of GCUs to different usage groups may be based on how frequently different GCUs are updated by a host. Thus, GCUs 202 and 204 may have host update frequencies that are within a first range of host update frequencies that define usage group 218. Similarly, GCUs 206, 208 and 210 may have host update frequencies that are within a second range of host update frequencies that define usage group 220. On a similar basis, GCUs 212, 214 and 216 may be assigned to usage group 222. In general, any suitable criteria may be used to define usage groups. Also, as will be described below, under certain conditions, a GCU may be reassigned to a different usage group.

Figure 3A:
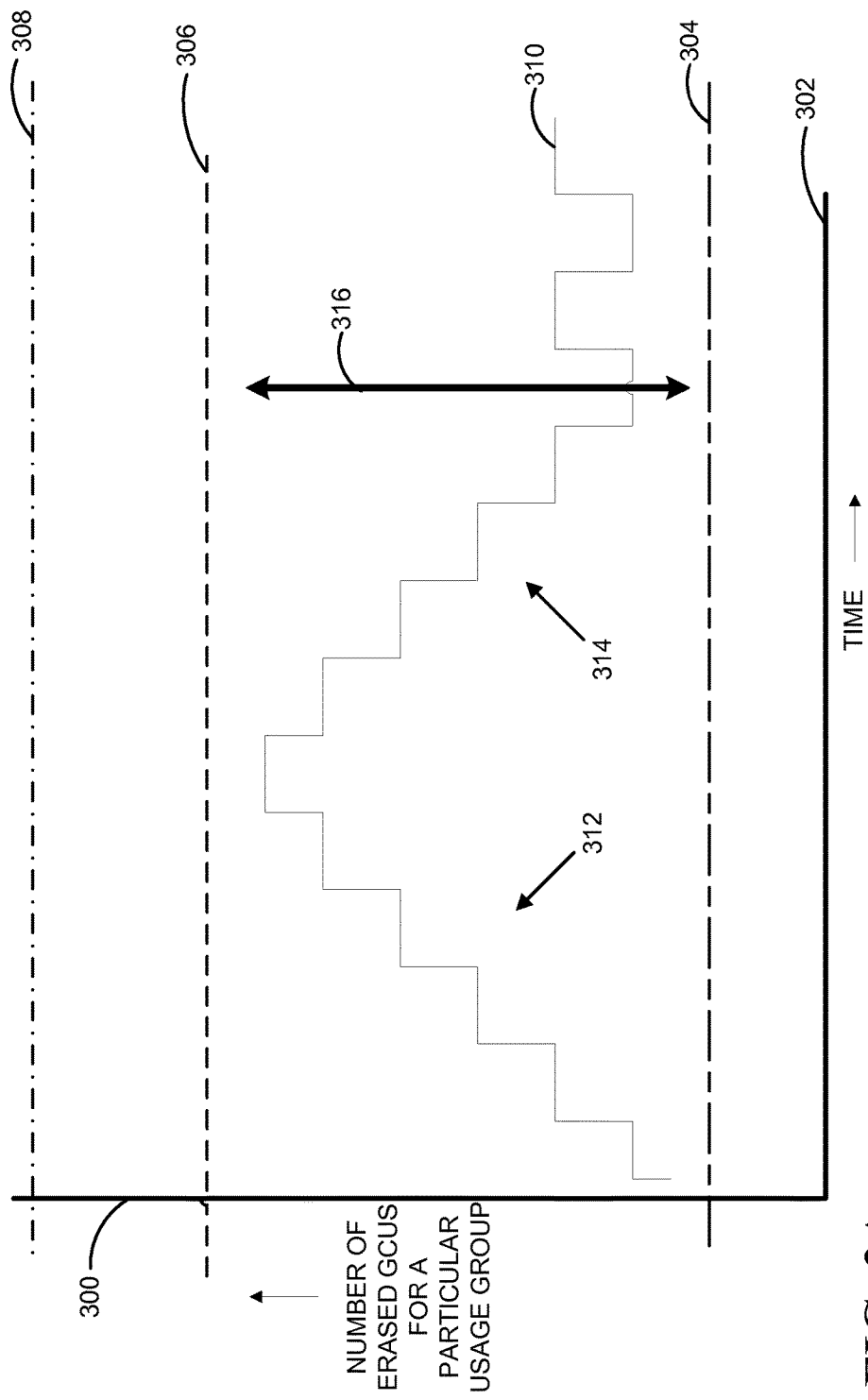
FIGS. 3A through 3C are plots showing different aspects of one illustrative just in time garbage collection embodiment.
Figure 3B:
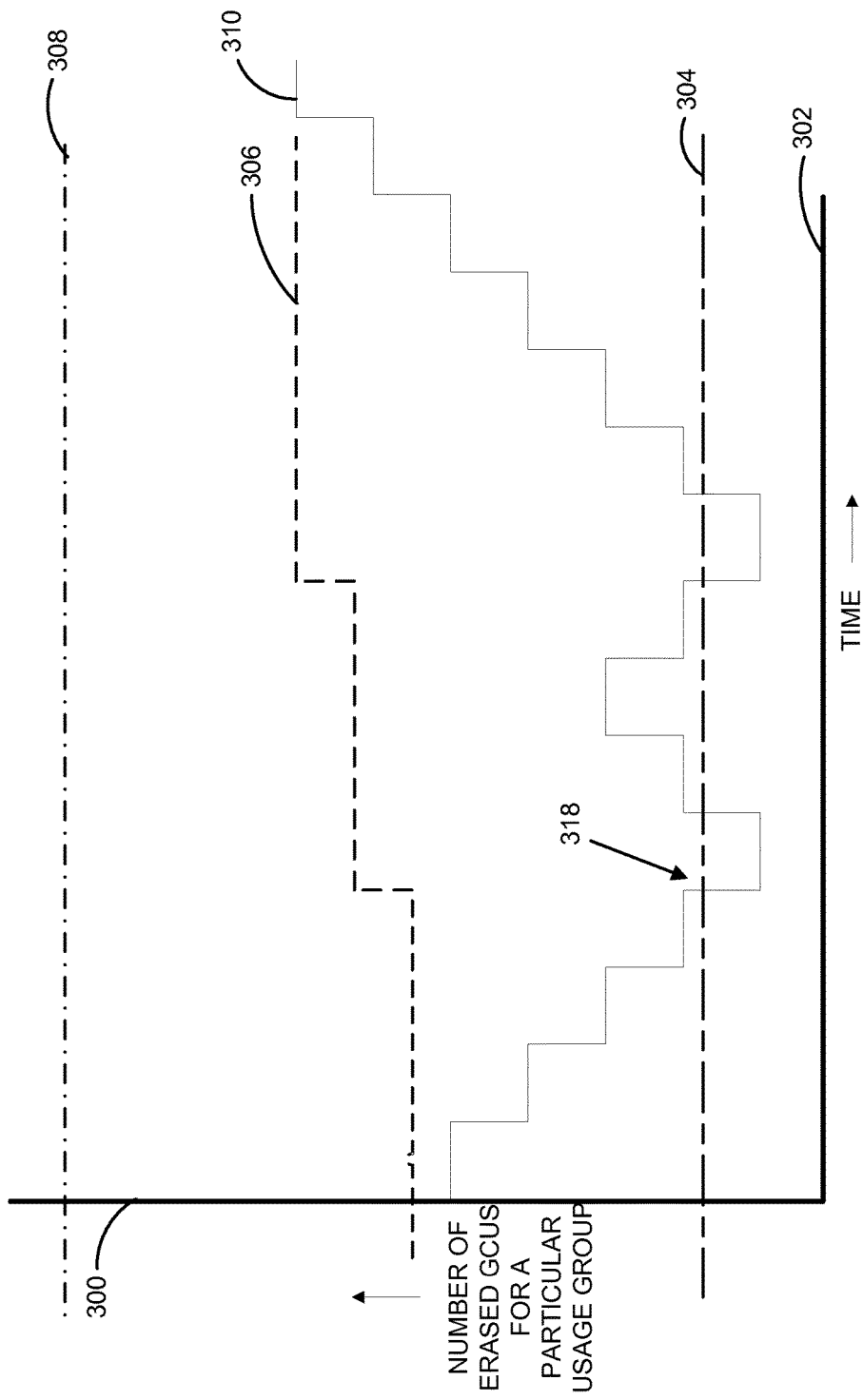
Figure 3C:
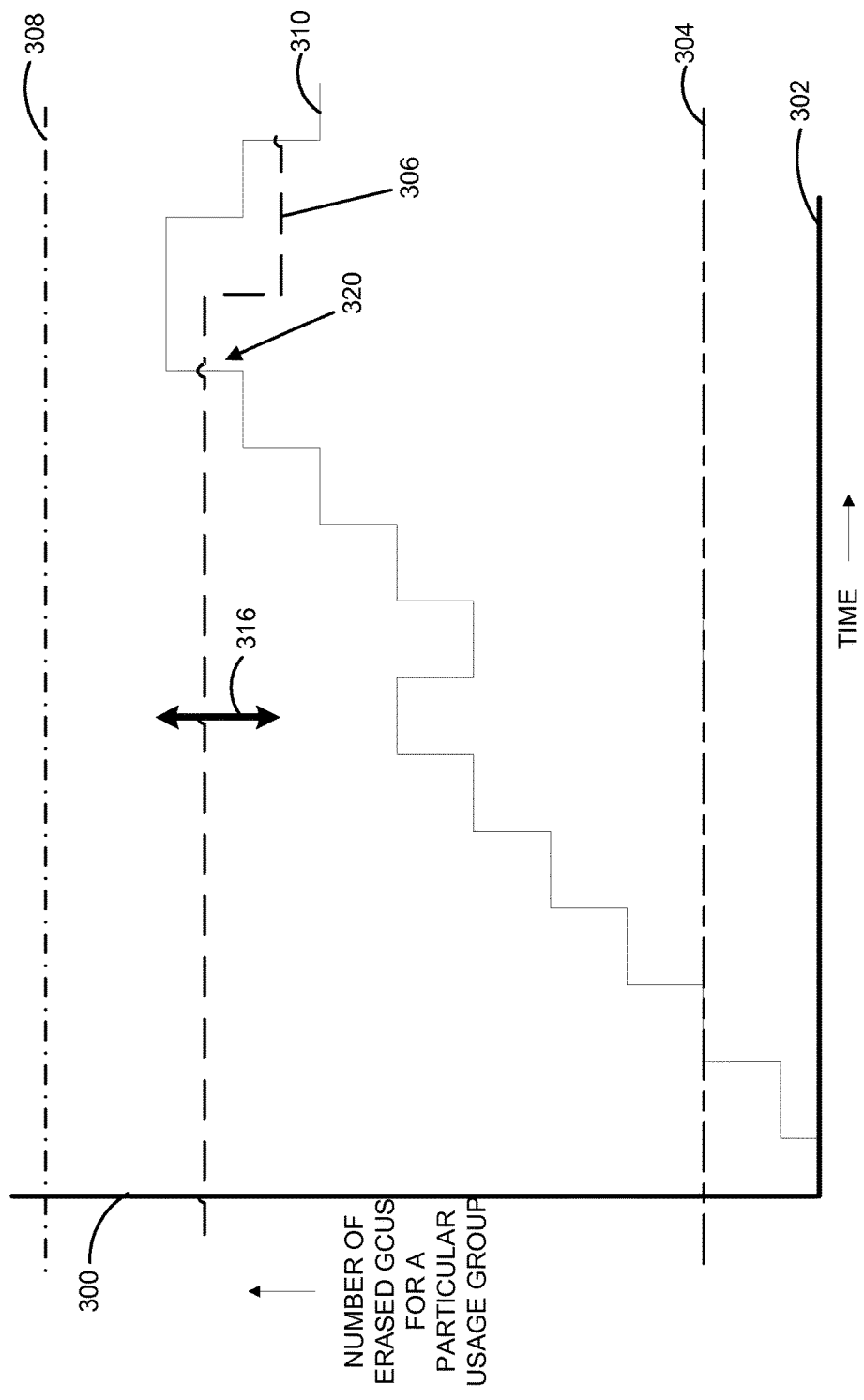

In one embodiment, to carry out just in time garbage collection, garbage collection management circuit 111 employs a fixed minimum number, a variable maximum number, and a fixed maximum number of erased GCUs for each usage group 218, 220, 222. A task (computer program) executed by garbage collection management circuit 111 monitors erased GCU usage by usage group 218, 220, 222 and schedules garbage collection requests using a memory request priority scheme of the host system. The task filters the demand for write ready GCUs for each usage group 218, 220, 222 (by using an exponentially smoothing filter, for example) and uses that information to determine a priority of garbage collection requests being submitted. FIGS. 3A through 3C are graphs that illustrate features of this embodiment.

As can be seen in FIG. 3A, vertical axis 300 represents a number of erased GCUs for a particular usage group and horizontal axis 300 is a time axis. In FIG. 3A, horizontal line 304 is a fixed minimum number or threshold of erased GCUs for a particular usage group. Horizontal line 306 is a variable maximum number or threshold of erased GCUs for the particular usage group, and horizontal line 308 is a fixed maximum number or threshold of erased GCUs for the particular usage group. Plot 310 illustrates a variation in a number of erased GCUs for a particular usage group over time. Region 312 of plot 310 shows a build up in a number of erased GCUs over time and region 314 of plot 310 shows a draw down in the number of erased GCUs as a result of host input/output functions consuming erased GCUs. Vertical line 316 illustrates a correlation between demand for GCUs and garbage collection priority. A number of erased GCUs approaching an upper end of line 316 may be an indication of a decreased demand for erased GCUs in the particular usage group. This results in GCUs in the particular usage group being assigned a lower garbage collection priority than GCUs belonging to usage groups in which there is a relatively greater demand for GCUs. A number of erased GCUs approaching a lower end of line 316 is an indication of an increased demand for erased GCUs in the particular usage group, which results in a corresponding assignment of a higher garbage collection priority for the GCUs for that group. In spite of the GCUs being assigned a higher garbage collection priority, if the particular usage group is continually running out of GCUs, then the variable maximum number of ready GCUs 306 for the usage group is increased. This is shown in FIG. 3B, which illustrates this scenario by showing variable maximum threshold 306 moved higher in response to the erased GCU count passing the fixed minimum threshold 304 at region 318. It should be noted that, in some embodiments, any non-used erased GCUs may be reallocated to a different usage group if not consumed by host traffic in a predetermined amount of time. If the particular usage group is, on average, not using its erased GCUs, then the variable maximum threshold 306 is decreased. FIG. 3C illustrates this scenario by showing that the variable maximum threshold 306 is decreased in response to the erased GCU count passing the variable maximum threshold 306 at region 320. In such embodiments, the variable maximum threshold adjusts according to GCU usage as not to take away from over-provisioning space unnecessarily. Having a queue of ready erased GCUs per usage group, with the number of erased GCUs tailored specifically to the host's trended demand, prevents "hitting the wall" and throttling host traffic until garbage collection is completed to hold the new data.

Figure 4:
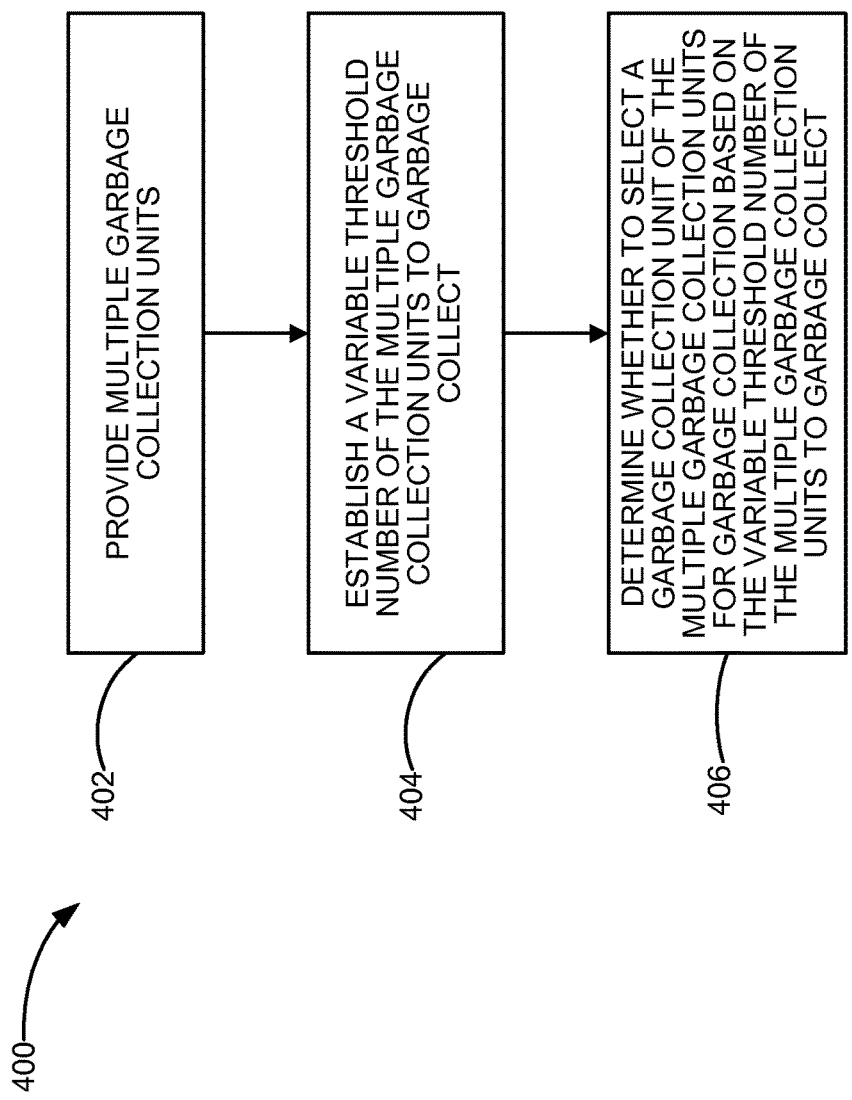
FIG. 4 is a flow diagram of an embodiment of a garbage collection method in accordance with one embodiment.

Referring to FIG. 4, a very simplified flow diagram of a particular illustrative embodiment of a method of memory management is shown and generally designated 400. The method 400 may be implemented via the garbage collection management circuit 111. The method 400 may include providing multiple garbage collection units, at 402. The method may then include establishing a variable threshold number of the multiple garbage collection units to garbage collect, at 404. The method may also include determining whether to select a garbage collection unit of the multiple garbage collection units for garbage collection based on the variable threshold number of the multiple garbage collection units to garbage collect, at 406.

In accordance with various embodiments, the methods described herein may be implemented as one or more software programs stored on a computer-readable medium and executed by a computer processor or controller, such as the controller 110, which includes garbage collection management circuit 111. Dedicated hardware implementations including, but not limited to, application specific integrated circuits, programmable logic arrays and other hardware devices can likewise be constructed to implement all or part of the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A memory comprising:
   a plurality of physical garbage collection units divided into different usage groups with each of the different usage groups comprising one or more different ones of the plurality of garbage collection units; and
   a controller configured to perform just in time garbage collection of the plurality of physical garbage collection units by:
      monitoring erased garbage collection unit usage in the different usage groups;
      scheduling garbage collection requests for submission to a particular one of the different usage groups based on the erased garbage collection unit usage within the particular usage group;
      assigning a higher garbage collection priority to the particular usage group if a demand for garbage collection units within the particular usage group increases relative to a demand for garbage collection units within other ones of the usage groups; and
      if erased garbage collection units are unavailable in the particular usage group after the particular usage group is assigned the higher garbage collection pri- ority, increasing a variable threshold number of erased garbage collection units for the particular usage group, and wherein the controller is further configured to alter the variable threshold number of erased garbage collection units for the particular usage group in response an erased garbage collection unit count in the particular usage group passing the variable threshold number of erased garbage collection units for the particular usage group.

2. The memory of claim 1 and wherein the controller is further configured to perform just in time garbage collection of the plurality of garbage collection units based on a fixed minimum threshold number of erased garbage collection units for the particular usage group.

3. The memory of claim 2 and wherein the controller is further configured to perform just in time garbage collection of the plurality of physical garbage collection units based on a fixed maximum threshold number of erased garbage collection units for the particular usage group.

4. The memory of claim 1 wherein the variable threshold number of erased garbage collection units for the particular usage group is a variable maximum threshold number of erased garbage collection units for the particular usage group.

5. The memory of claim 1 and wherein the different garbage collection units of the plurality of physical garbage collection units belong to the different usage groups based on nature of usage.

6. The memory of claim 1 and wherein the controller is further configured to reassign a physical garbage collection unit, of the plurality of physical garbage collection units, which belongs to a first usage group of the different usage groups to a second usage group of the different usage groups based on one more predetermined reassignment criteria.

7. The memory of claim 6 wherein the one or more reassignment criteria include a predetermined amount of time for consumption by host traffic.

8. The memory of claim 2 and wherein the controller is further configured to alter the variable threshold number of erased garbage collection units for the particular usage group in response to the erased garbage collection unit count passing the fixed minimum threshold number of erased garbage collection units for the particular usage group.

9. A method comprising:

providing a plurality of physical garbage collection units divided into different usage groups with each of the different usage groups comprising one or more different ones of the plurality of garbage collection units;

establishing a variable threshold number of erased garbage collection units for each of the different usage groups; and performing just in time garbage collection of the plurality of physical garbage collection units by:

monitoring erased garbage collection unit usage in the different usage groups;

scheduling garbage collection requests for submission to a particular one of the different usage groups based on the erased garbage collection unit usage within the particular usage group;

assigning a higher garbage collection priority to the particular usage group if a demand for garbage collection units within the particular usage group increases relative to a demand for garbage collection units within other ones of the usage groups; and if erased garbage collection units are unavailable in the particular usage group after the particular usage group is assigned the higher garbage collection priority, increasing the variable threshold number of erased garbage collection units for the particular usage group, and altering the variable threshold number of erased garbage collection units for the particular usage group in response an erased garbage collection unit count in the particular usage group passing the variable threshold number of erased garbage collection units for the particular usage group.

10. The method of claim 9 and further comprising performing just in time garbage collection of the plurality of physical garbage collection units based on a fixed minimum threshold number of erased garbage collection units for the particular usage group.

11. The method of claim 10 and further comprising performing just in time garbage collection of the plurality of physical garbage collection units based on a fixed maximum threshold number of erased garbage collection units for the particular usage group.

12. The method of claim 9 wherein the variable threshold number of erased garbage connection units of the plurality of physical garbage collection units is a variable maximum threshold number of erased garbage collection units for the particular usage group.

13. The method of claim 9 and further comprising:

selecting one of the plurality of physical garbage collection units; and performing a garbage collection operation on the selected physical garbage collection unit.

* * * * *